(12) United States Patent
Lee

(10) Patent No.: US 12,090,999 B2
(45) Date of Patent: Sep. 17, 2024

(54) APPARATUS AND METHOD FOR ASSISTING DRIVING OF VEHICLE

(71) Applicant: HL Klemove Corp., Incheon (KR)

(72) Inventor: Sangyeob Lee, Seongnam-si (KR)

(73) Assignee: HL Klemove Corp., Incheon (KR)

( * ) Notice: Subject to any disclaimer, the term of this patent is extended or adjusted under 35 U.S.C. 154(b) by 269 days.

(21) Appl. No.: 17/724,936

(22) Filed: Apr. 20, 2022

(65) Prior Publication Data

US 2022/0332312 A1 Oct. 20, 2022

(30) Foreign Application Priority Data

Apr. 20, 2021 (KR) ........................ 10-2021-0051199

(51) Int. Cl.
| | | |
|---|---|---|
| *B60W 30/09* | (2012.01) | |
| *B60W 10/18* | (2012.01) | |
| *B60W 30/095* | (2012.01) | |
| *B60W 30/16* | (2020.01) | |
| *B60W 40/04* | (2006.01) | |
| *G01S 13/931* | (2020.01) | |

(52) U.S. Cl.
CPC ............ *B60W 30/09* (2013.01); *B60W 10/18* (2013.01); *B60W 30/0956* (2013.01); *B60W 30/16* (2013.01); *B60W 40/04* (2013.01); *G01S 13/931* (2013.01); *B60W 2420/408* (2024.01); *B60W 2554/80* (2020.02); *G01S 2013/93185* (2020.01); *G01S 2013/93271* (2020.01)

(58) Field of Classification Search
CPC .. B60W 30/09; B60W 10/18; B60W 30/0956; B60W 30/16; B60W 40/04; B60W 2420/408; B60W 2554/80; B60W 2540/12; B60W 2540/18; B60W 2554/4041; B60W 2554/4042; B60W 2554/406; B60W 2554/802; B60W 2554/804; B60W 30/08; B60W 10/20; B60W 40/02; B60W 2050/0005; G01S 13/931; G01S 2013/93185; G01S 2013/93271; B60R 21/0134; B60Y 2300/08; B60Y 2400/81

See application file for complete search history.

(56) References Cited

U.S. PATENT DOCUMENTS

| | | | |
|---|---|---|---|
| 8,260,538 B2 * | 9/2012 | Noda ........................ | B60T 7/22 342/107 |
| 2022/0332319 A1 * | 10/2022 | Park ........................ | G08G 1/165 |

FOREIGN PATENT DOCUMENTS

KR        2006021388 A  *  3/2006  ........... B60R 21/013

* cited by examiner

*Primary Examiner* — Peter D Nolan
*Assistant Examiner* — Demetra R Smith-Stewart
(74) *Attorney, Agent, or Firm* — Harvest IP Law, LLP

(57) ABSTRACT

An apparatus for assisting driving of a vehicle includes: a radar mounted on the vehicle to have a front field of view of the vehicle and configured to acquire detection data; and a controller including a processor, configured to process the detection data, and configured to identify an estimated collision time between the vehicle and a first preceding vehicle, located in front of the vehicle, based on processing of the detection data, and to control a braking system of the vehicle to brake the vehicle, in response to the estimated collision time being less than a reference time, wherein the controller is configured to increase a reference time for braking the vehicle, based on an acceleration and a travelling speed of the first preceding vehicle and an acceleration and a travelling speed of a second preceding vehicle, located in front of the first preceding vehicle.

15 Claims, 7 Drawing Sheets

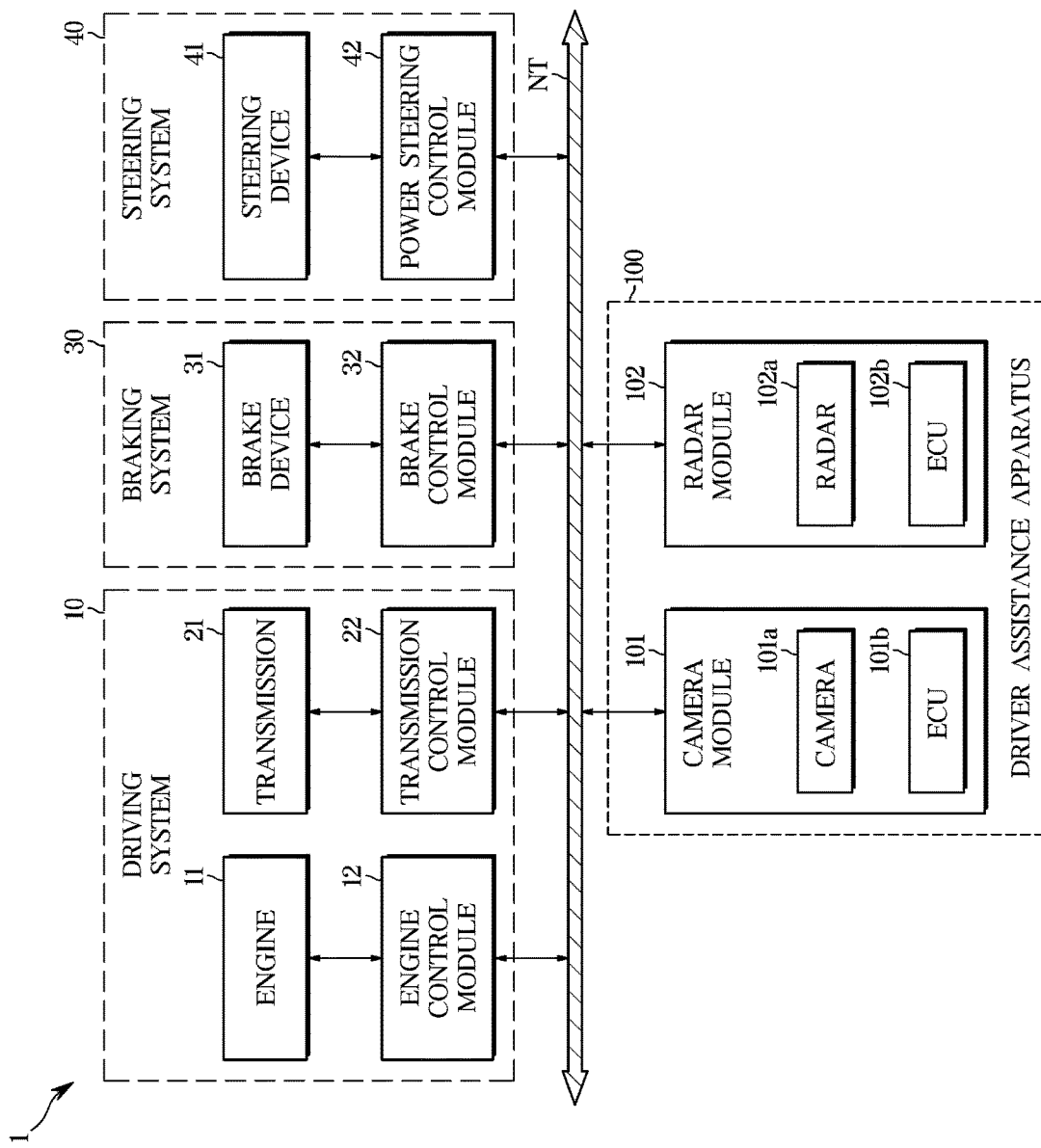
[FIG. 1]

[FIG. 2]
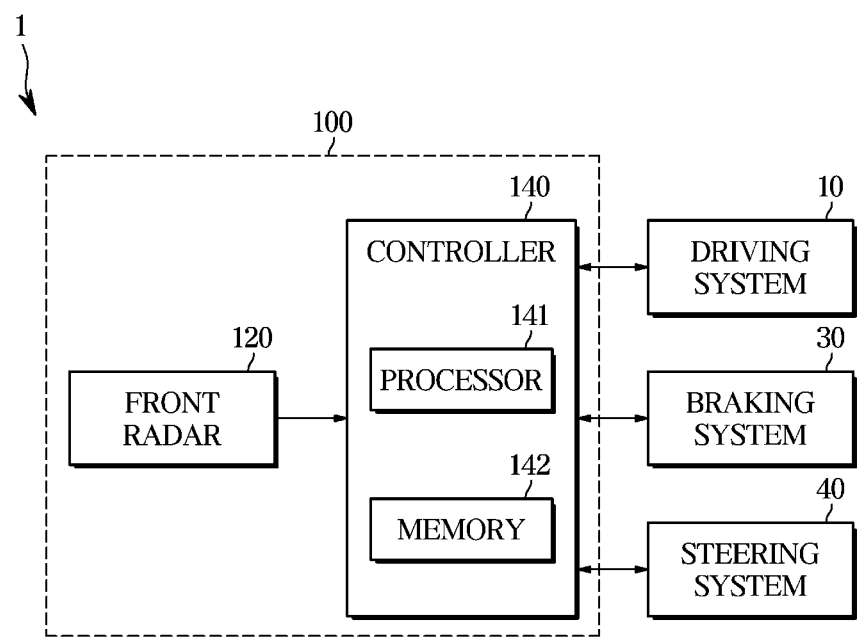

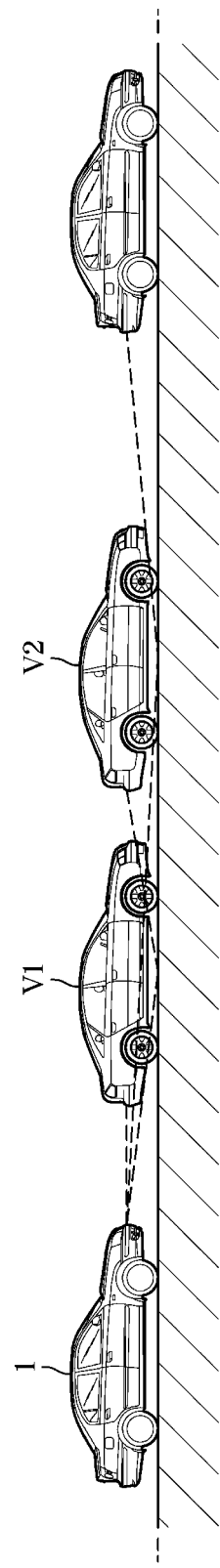

[FIG. 4]
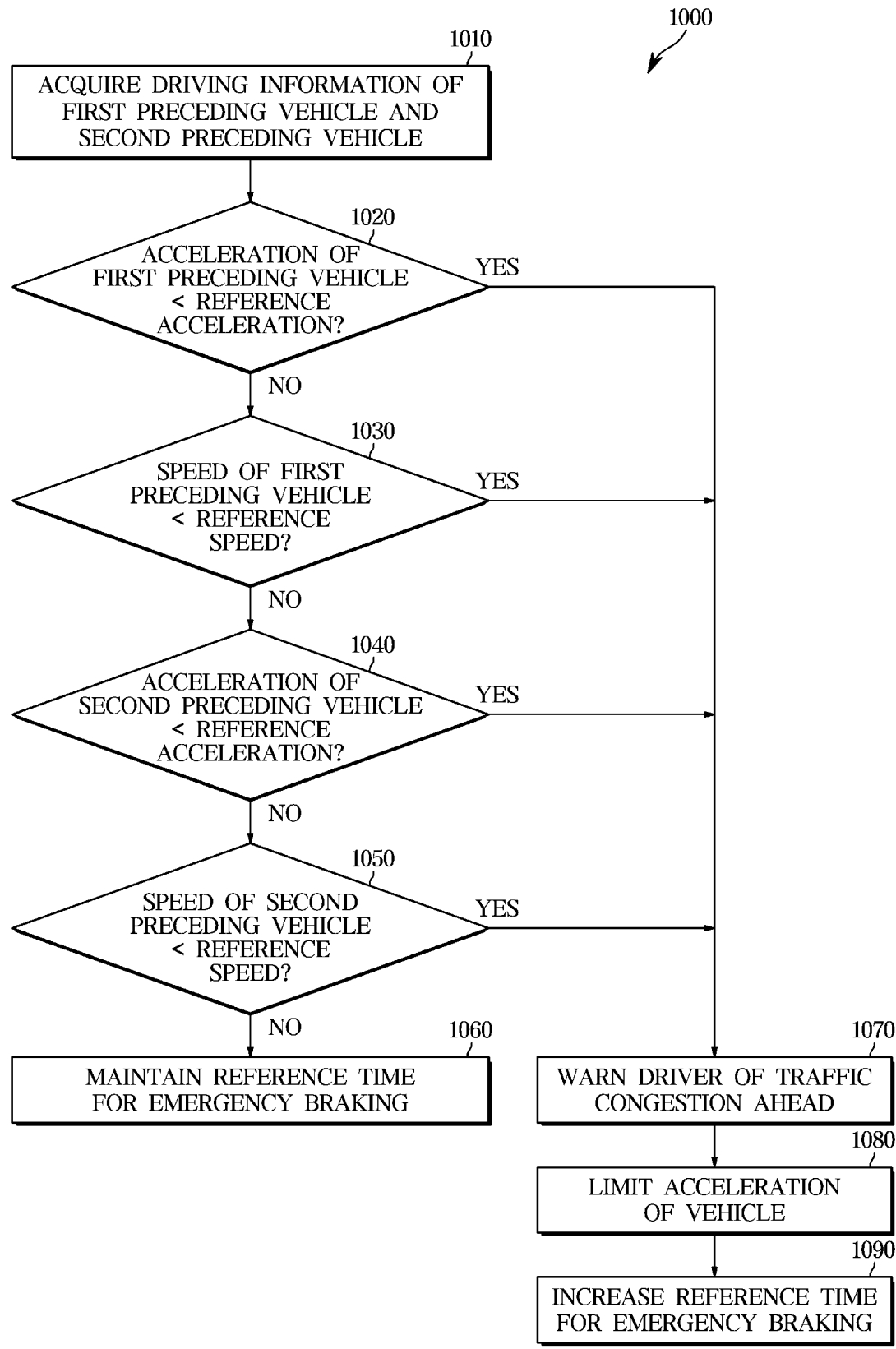

[FIG. 5]
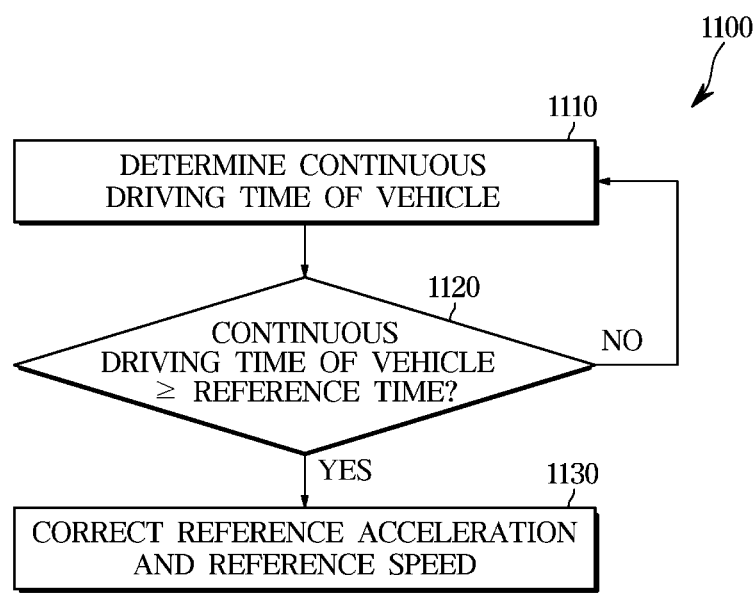

[FIG. 6]
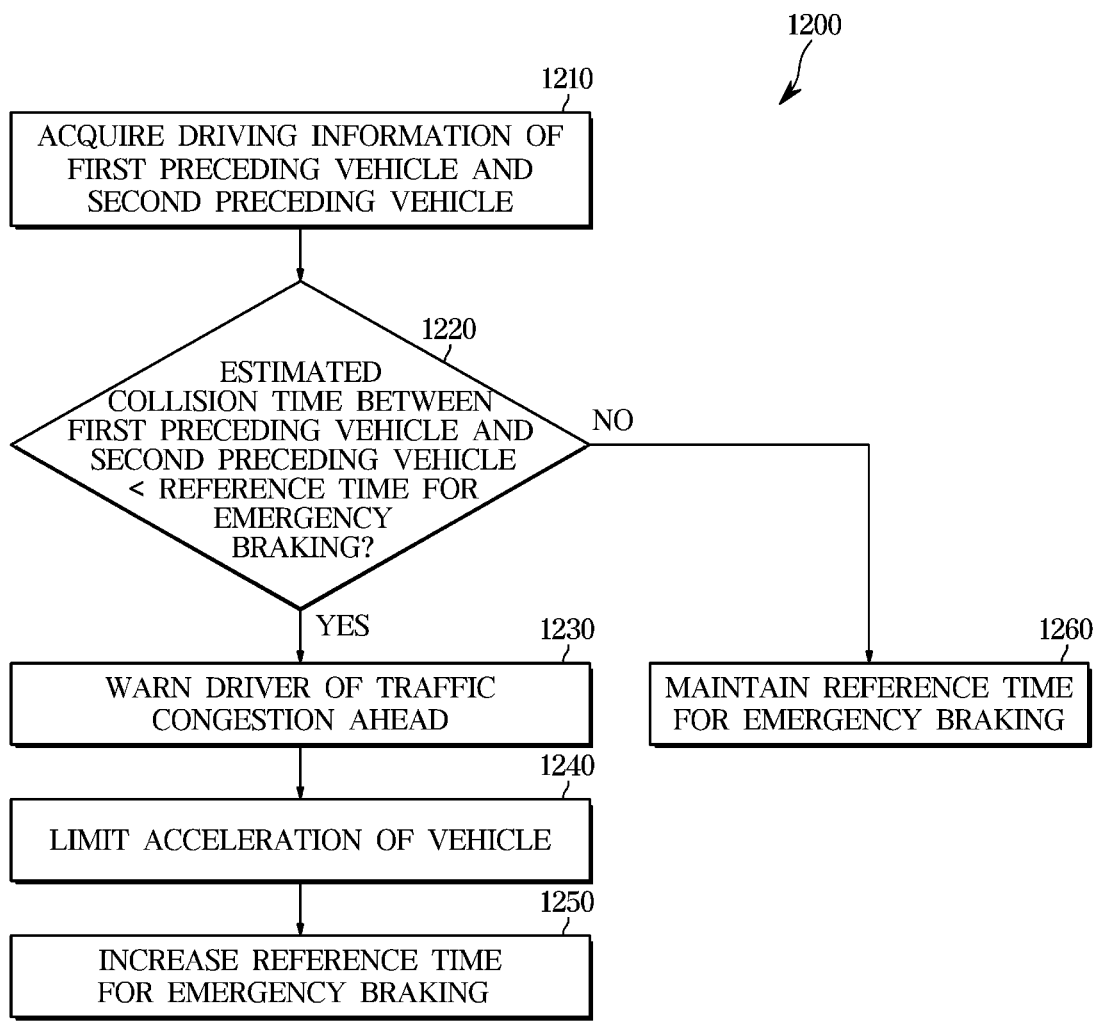

[FIG. 7]
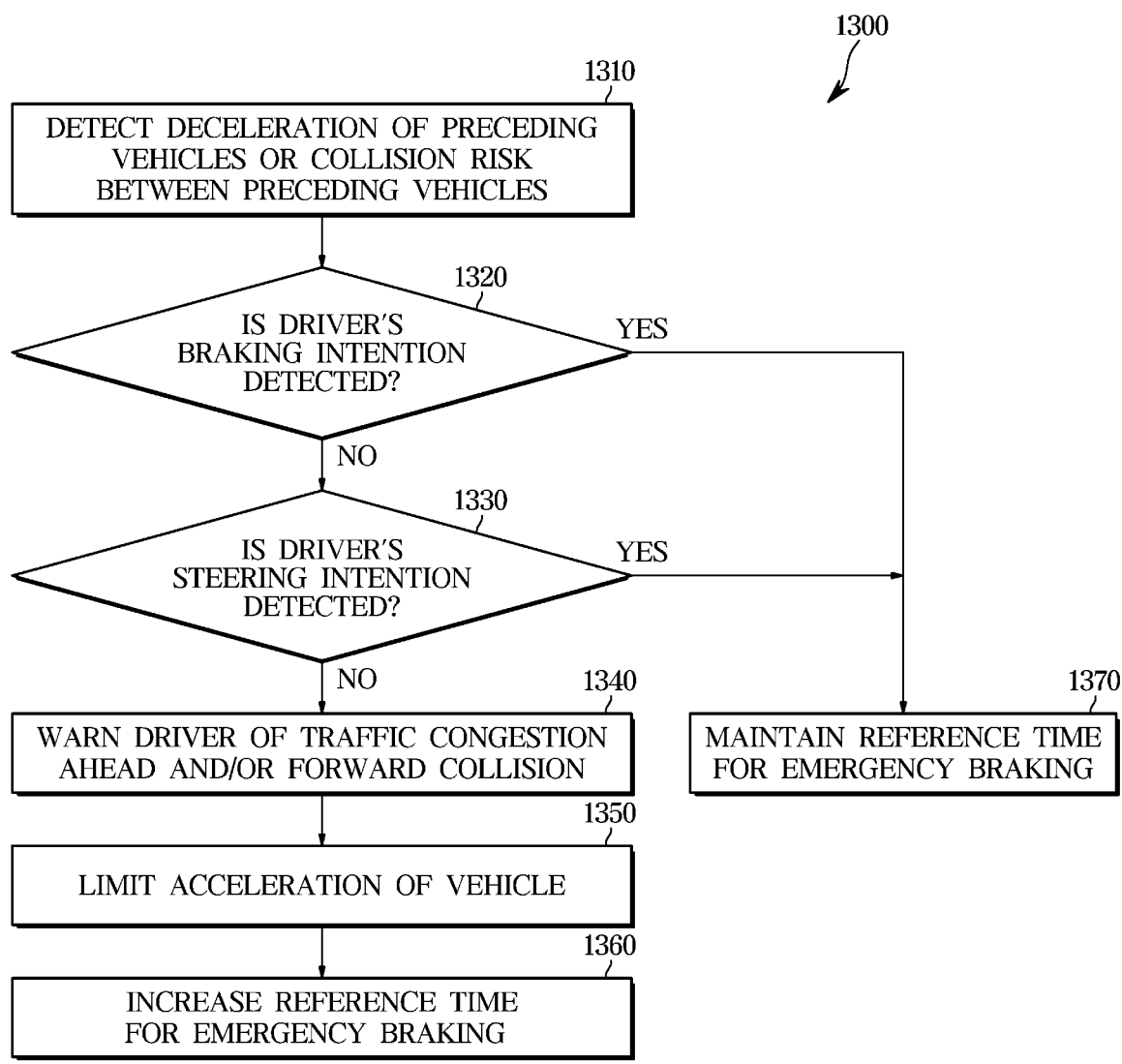

APPARATUS AND METHOD FOR ASSISTING DRIVING OF VEHICLE

CROSS-REFERENCE TO RELATED APPLICATION

This application is based on and claims priority under 35 U.S.C. § 119 to Korean Patent Application No. 10-2021-0051199, filed on Apr. 20, 2021 in the Korean Intellectual Property Office, the disclosure of which is incorporated herein by reference.

BACKGROUND

1. Technical Field

The disclosure relates to an apparatus and method for assisting driving of a vehicle, and more specifically, to an apparatus and method for assisting driving of a vehicle that may avoid a collision with an object.

2. Background Art

As the most common means of transportation in modern society, the number of people using vehicles is increasing. Although the development of vehicle technology has the advantage of making long-distance travel easier and living more conveniently, traffic congestion often occurs in places with high population density such as South Korea.

A lot of research on a vehicle equipped with an advanced driver assistance system (ADAS) that actively provides information about a vehicle state, a driver state and traffic environment has been recently carried out to reduce drivers' burden and improve convenience.

For example, ADAS may provide functions such as a forward collision avoidance (FCA), an autonomous emergency braking (AEB), a driver attention warning (DAW), and the like. Such systems are for avoiding collision and providing warning by determining a risk of collision with an object during driving and performing emergency braking.

A conventional driver assistance system, for example, monitors a relative speed and a relative distance of a first preceding vehicle and avoids a collision with the first preceding vehicle based on the relative speed and relative distance of the first preceding vehicle.

SUMMARY

An aspect of the disclosure provides an apparatus and method for assisting driving of a vehicle that may avoid a collision with a first preceding vehicle, based on a relative speed and a relative distance of the first preceding vehicle as well as a relative speed and a relative distance of a preceding vehicle of the first preceding vehicle (hereinafter, referred to as a pre-preceding vehicle).

Additional aspects of the disclosure will be set forth in part in the description which follows and, in part, will be obvious from the description, or may be learned by practice of the disclosure.

According to an aspect of the disclosure, there is provided an apparatus for assisting driving of a vehicle, the apparatus including: a radar mounted on the vehicle to have a front field of view of the vehicle and configured to acquire detection data; and a controller including a processor, configured to process the detection data, and configured to identify an estimated collision time between the vehicle and a first preceding vehicle, located in front of the vehicle, based on processing of the detection data, and to control a braking system of the vehicle to brake the vehicle in response to the estimated collision time being less than a reference time, wherein the controller is configured to increase a reference time for braking the vehicle, based on an acceleration and a travelling speed of the first preceding vehicle and an acceleration and a travelling speed of a second preceding vehicle, located in front of the first preceding vehicle.

According to an aspect of the disclosure, there is provided a method for assisting driving of a vehicle, the method including: acquiring detection data through a radar, mounted on the vehicle to have a front field of view of the vehicle; and identifying an estimated collision time between the vehicle and a first preceding vehicle, located in front of the vehicle, based on processing of the detection data; and controlling a braking system of the vehicle to brake the vehicle in response to the estimated collision time being less than a reference time, wherein the controlling of the braking system of the vehicle to brake the vehicle includes increasing a reference time for braking the vehicle, based on an acceleration and a travelling speed of the first preceding vehicle and an acceleration and a travelling speed of a second preceding vehicle, located in front of the first preceding vehicle.

According to an aspect of the disclosure, there is provided an apparatus for assisting driving of a vehicle, the apparatus including: a radar mounted on the vehicle to have a front field of view of the vehicle and configured to acquire detection data; and a controller including a processor, configured to process the detection data, and configured to identify an estimated collision time between the vehicle and a first preceding vehicle, located in front of the vehicle, based on processing of the detection data, and to control a braking system of the vehicle to brake the vehicle in response to the estimated collision time being less than a reference time, wherein the controller is configured to identify an estimated collision time between the first preceding vehicle and a second preceding vehicle, located in front of the first preceding vehicle, based on processing of the detection data, and to increase a reference time for braking the vehicle, in response to the estimated collision time between the first preceding vehicle and the second preceding vehicle being less than the reference time.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 1 illustrates a configuration of a vehicle according to an embodiment;

FIG. 2 illustrates a configuration of a driver assistance apparatus according to an embodiment;

FIG. 3 illustrates detection of an object by a front radar of a driver assistance apparatus according to an embodiment;

FIG. 4 illustrates an example of collision avoidance operation by a driver assistance apparatus according to an embodiment;

FIG. 5 illustrates operations of changing a parameter for collision avoidance by a driver assistance apparatus according to an embodiment;

FIG. 6 illustrates an example of collision avoidance operation by a driver assistance apparatus according to an embodiment; and FIG. 7 illustrates an example of collision avoidance operation by a driver assistance apparatus according to an embodiment.

DETAILED DESCRIPTION

Like reference numerals throughout the specification denote like elements. Also, this specification does not describe all the elements according to embodiments of the disclosure, and descriptions well-known in the art to which the disclosure pertains or overlapped portions are omitted. The terms such as "~part", "~member", "~module", "~block", and the like may refer to at least one process processed by at least one hardware or software. According to embodiments, a plurality of "~part", "~member", "~module", "~block" may be embodied as a single element, or a single of "~part", "~member", "~module", "~block" may include a plurality of elements.

It will be understood that when an element is referred to as being "connected" to another element, it can be directly or indirectly connected to the other element, wherein the indirect connection includes "connection" via a wireless communication network.

It will be understood that the term "include" when used in this specification, specifies the presence of stated features, integers, steps, operations, elements, and/or components, but do not preclude the presence or addition of one or more other features, integers, steps, operations, elements, components, and/or groups thereof.

It will be understood that when it is stated in this specification that a member is located "on" another member, not only a member may be in contact with another member, but also still another member may be present between the two members.

It will be understood that, although the terms first, second, etc. may be used herein to describe various elements, these elements should not be limited by these terms.

It is to be understood that the singular forms are intended to include the plural forms as well, unless the context clearly dictates otherwise.

Reference numerals used for method steps are just used for convenience of explanation, but not to limit an order of the steps. Thus, unless the context clearly dictates otherwise, the written order may be practiced otherwise.

Hereinafter, an operation principle and embodiments will be described in detail with reference to the accompanying drawings.

FIG. 1 illustrates a configuration of a vehicle according to an embodiment.

As shown in FIG. 1, a vehicle 1 includes a driving system 10, a braking system 30, a steering system 40 and a driver assistance apparatus 100.

The driving system 10 may generate and provide power for moving the vehicle 1, and include an engine 11, an engine control module 12, a transmission 21 and a transmission control module 22. The engine 11 may generate power for driving the vehicle 1. The engine control module 12 may control the engine 11 in response to a driver's acceleration intention through an accelerator pedal or a request from the driver assistance apparatus 100. Also, the engine control module 12 may provide the driver assistance apparatus 100 with information about displacement of the accelerator pedal indicating the driver's acceleration intention. The transmission 21 may decelerate and transmit the power generated by the engine 11 to vehicle wheels. The transmission control module 22 may control the transmission 21 to adjust a shift ratio from the engine 11 to the vehicle wheels.

The braking system 30 may stop the vehicle 1 and include a brake device 31 and a brake control module 32. The brake device 31 may decelerate or stop the vehicle 1 by stopping rotation of wheels using friction. The brake control module 32 may control the brake device 31 to stop the vehicle 1 in response to a driver's braking intention through a brake pedal and/or movement of the vehicle 1. The brake control module 32 may control the brake device 31 to stop the vehicle 1 in response to a request from the driver assistance apparatus 100. Also, the brake control module 32 may provide the driver assistance apparatus 100 with information about displacement of the brake pedal indicating the driver's braking intention.

The steering system 40 may include a steering device 41 and a power steering control module 42. The steering device 41 may change a direction of rotating shaft of wheel to change a driving direction of the vehicle 1. The power steering control module 42 may assist operations of the steering device 41 so that a driver may easily manipulate a steering wheel according to a driver's steering intention. The power steering control module 42 may control the steering device 41 in response to a request from the driver assistance apparatus 100. Also, the power steering control module 42 may provide the driver assistance apparatus 100 with information about a steering angle of the steering wheel indicating the driver's steering intention.

The driver assistance apparatus 100 may assist the driver's operations (driving, braking, steering) of the vehicle 1. For example, the driver assistance apparatus 100 may detect an object (e.g., another vehicle, pedestrian, cyclist, lane, road sign, etc.) around the vehicle 1, and control driving and/or braking and/or steering of the vehicle 1 in response to the detection.

The driver assistance apparatus 100 may provide the driver with a variety of functions. For example, the driver assistance apparatus 100 may provide functions such as a lane departure warning (LDW), a lane keeping assist (LKA), a high beam assist (HBA), an autonomous emergency braking (AEB), a traffic sign recognition (TSR), an adaptive cruise control (ACC), a blind spot detection (BSD), and the like.

The driver assistance apparatus 100 includes a camera module 101 for acquiring image data around the vehicle 1, and a radar module 102 for acquiring object data around the vehicle 1. The camera module 101 includes a camera 101a and an electronic control unit (ECU) 101b, and may recognize other vehicles, pedestrians, cyclists, lanes, road signs, etc., by photographing a front of the vehicle 1. The radar module 102 includes a radar 102a and an ECU 102b, and may acquire relative locations, relative speeds, etc., of objects (e.g., other vehicles, pedestrians, cyclists, etc.) around the vehicle 1.

The driver assistance apparatus 100 is not limited to that illustrated in FIG. 1, and may further include a light detection and ranging (lidar) that detects an object around the vehicle 1 by scanning around the vehicle 1.

The above electronic components may communicate with each other through a vehicle communication network (NT). For example, the electronic components may transmit and receive data through controller zone network (CAN), local interconnect network (LIN), and the like. For instance, the driver assistance apparatus 100 may transmit a driving signal, a transmission signal, a braking signal and a steering signal to the engine control module 12, the transmission control module 22, the brake control module 32 and the power steering control module 42, respectively, through the vehicle communication network.

FIG. 2 illustrates a configuration of a driver assistance apparatus according to an embodiment. FIG. 3 illustrates detection of an object by a front radar of a driver assistance apparatus according to an embodiment.

As shown in FIG. 2, the vehicle 1 may include the driving system 10, the braking system 30, the steering system 40 and the driver assistance apparatus 100.

Here, the driving system 10, the braking system 30, the steering system 40 and the driver assistance apparatus 100 may be the same as those of FIG. 1.

The driver assistance apparatus 100 may include a front radar 120 and a controller 140.

The front radar 120 may be provided separately from the controller 140. For example, the controller 140 may be installed in a housing separated from a housing of the front radar 120. The controller 140 may transmit and receive data with the front radar 120 through a wide bandwidth network.

The front radar 120 may have a field of sensing facing the front of the vehicle 1. For example, the front radar 120 may be installed in a grille or a bumper of the vehicle 1.

The front radar 120 may include a transmission antenna (or a transmission antenna array) that transmits a detection wave toward the front of the vehicle 1, and a receiving antenna (or a receiving antenna array) that receives a reflected wave reflected from an object. The front radar 120 may acquire radar data from the detection wave transmitted by the transmission antenna and the reflected wave received by the receiving antenna. The radar data may include distance information and speed information about other vehicles, pedestrians or cyclists located in front of the vehicle 1. The front radar 120 may provide the radar data to the controller 140, and the controller 140 may calculate a relative distance to an object based on a phase difference (or a time difference) between the detection wave and the reflected wave, and calculate a relative speed of the object based on a frequency difference between the detection wave and the reflected wave. (Doppler effect)

For example, the front radar 120 may be connected to the controller 140 via a vehicle communication network, a hard wire, or a printed circuit board (PCB). The front radar 120 may transmit the radar data to the controller 140.

For instance, as shown in FIG. 3, the front radar 120 may emit a detection wave toward the front. In this instance, the detection wave emitted by the front radar 120 is reflected by a first preceding vehicle v1 of the vehicle 1, and the front radar 120 may receive the reflected wave reflected from the first preceding vehicle v1. Here, the first preceding vehicle v1 of the vehicle 1 refers to a vehicle travelling in front of the vehicle 1 on the same lane as the vehicle 1, and no other vehicle exists between the vehicle 1 and the first preceding vehicle v1.

The front radar 120 may provide the controller 140 with radar data including information about the reflected wave, and the controller 140 may identify a relative distance d1 and a relative speed rs1 of the first preceding vehicle v1 based on the radar data.

Also, the detection wave emitted by the front radar 120 may propagate toward the front of the first preceding vehicle v1 through various paths. For example, as shown in FIG. 3, the detection wave may be reflected by a road surface and propagate toward the front of the first preceding vehicle v1. The detection wave propagated toward the front of the first preceding vehicle v1 may be reflected by a vehicle v2 located in front of the first preceding vehicle v1 (hereinafter, referred to as a 'second preceding vehicle'). Here, the second preceding vehicle v2 refers to a vehicle travelling in front of the first preceding vehicle v1 on the same lane as the vehicle 1 and the first preceding vehicle v1, and no other vehicle exists between the first preceding vehicle v1 and the second preceding vehicle v2.

A reflected wave reflected from the second preceding vehicle v2 may be received by the vehicle 1 through various paths. For example, the reflected wave may be reflected by a road surface and received by the vehicle 1. The front radar 120 may provide the controller 140 with radar data including information about the reflected wave, and the controller 140 may identify a relative distance d2 and a relative speed rs2 of the second preceding vehicle v2 based on the radar data.

Further, a detection signal emitted by the front radar 120 may be propagated to the front of the second preceding vehicle v2 through various paths, and be reflected from a vehicle v3 located in front of the second preceding vehicle v2 (hereinafter, referred to as a 'pre-second preceding vehicle'). The front radar 120 may receive a reflection signal reflected from the pre-second preceding vehicle v3, and provide the controller 140 with radar data including the reflection signal. The controller 140 may identify a relative distance d3 and a relative speed rs30f the pre-second preceding vehicle v3 based on the radar data.

As such, the detection signal emitted by the front radar 120 may reach the first preceding vehicle v1, the second preceding vehicle v2 and the pre-second preceding vehicle v3, and the controller 140 may acquire driving information of the first preceding vehicle v1, the second preceding vehicle v2 and the pre-second preceding vehicle v3.

The controller 140 may include the ECU 102b (refer to FIG. 1) of the radar module 102 (refer to FIG. 1) and/or a separate integrated controller.

The controller 140 may be electrically connected to the front radar 120. Also, the controller 140 may be connected to the driving system 10, the braking system 30 and the steering system 40 through a vehicle communication network.

The controller 140 includes a processor 141 and a memory 142.

The processor 141 may process the radar data of the front radar 120, and generate a driving signal, a braking signal and a steering signal for controlling the driving system 10, the braking system 30 and the steering system 40, respectively. For example, the processor 141 may include a digital signal processor for processing the radar data of the front radar 120, and/or a micro control unit (MCU) for generating the driving signal/braking signal/steering signal.

The processor 141 may acquire a relative distance and relative speed of an object in front of the vehicle 1 based on the radar data of the front radar 120. For example, the processor 141 may determine relative distances and relative speeds of the first preceding vehicle v1, the second preceding vehicle v2 and the pre-second preceding vehicle v3.

The processor 141 may generate the driving signal, the braking signal and the steering signal based on the relative distance and relative speed of front object. For instance, the processor 141 may transmit, to the driving system 10, a driving signal for allowing a distance to the preceding vehicle v1, v2 or v3 (or time taken to reach a location of the preceding vehicle) to be a distance set by a driver. Also, the processor 141 may calculate a time to collision (TTC) (or a distance to collision (DTC)) (hereinafter, referred to as a 'estimated collision time') between the vehicle 1 and each of the front objects v1, v2 and v3, based on the relative distances and relative speeds of the front objects v1, v2 and v3, and also provide the driver with a warning about collision or transmit the braking signal to the braking system 30 based on comparison between the calculated estimated collision time (TTC) and a reference estimated collision time.

The memory 142 may store a program and/or data for the processor 141 to process the radar data, and a program and/or data for the processor 141 to generate the driving signal and/or the braking signal and/or the steering signal.

The memory 142 may temporarily store the radar data, received from the front radar 120, and a processing result of the radar data by the processor 141.

The memory 142 may include a volatile memory such as a static random access memory (S-RAM) and dynamic random access memory (D-RAM), and a non-volatile memory such as a flash memory, a read only memory (ROM), an erasable programmable read only memory (EPROM), and the like.

As such, the controller 140 may predict a collision with the first preceding vehicle v1 based on the radar data of the front radar 120, and transmit the braking signal to the braking system 30 based on the prediction.

In addition, the controller 140 may acquire driving information of the second preceding vehicle v2 and the pre-second preceding vehicle v3 based on the radar data of the front radar 120. The controller 140 may change a parameter for avoiding the collision with the first preceding vehicle v1, based on the driving information of the second preceding vehicle v2 and the pre-second preceding vehicle v3.

As described above, the controller 140 may determine an estimated collision time with the first preceding vehicle v1, and transmit a message to the braking system 30 for emergency braking of the vehicle 1, based on comparison between the determined estimated collision time and a reference time for emergency braking. Here, the reference time for emergency braking is a critical parameter for emergency braking of the vehicle 1 based on the driving information of the first preceding vehicle v1.

The controller 140 may change the reference time for emergency braking based on the driving information of the second preceding vehicle v2 and the pre-second preceding vehicle v3, in order to avoid the collision with the first preceding vehicle v1. For example, the controller 140 may increase the reference time for emergency braking based on a speed and acceleration of each of the second preceding vehicle v2 and the pre-second preceding vehicle v3. Also, the controller 140 may increase the reference time for emergency braking based on an estimated collision time between the first preceding vehicle v1 and the second preceding vehicle v2 and an estimated collision time between the second preceding vehicle v2 and the pre-second preceding vehicle v3.

Increasing the reference time for emergency braking refers to advancing a timing of emergency braking. For example, when the reference time for emergency braking is one second, the vehicle 1 may be braked one second before the collision with the first preceding vehicle v1, and when the reference time for emergency braking is two seconds, the vehicle 1 may be braked two seconds before the collision with the first preceding vehicle v1. Accordingly, when the reference time for emergency braking increases, a likelihood of collision between the vehicle 1 and the first preceding vehicle v1 may be reduced.

FIG. 4 illustrates an example of collision avoidance operations by a driver assistance apparatus according to an embodiment.

Collision avoidance operations 1000 by the driver assistance apparatus 100 are described with reference to FIG. 4.

The driver assistance apparatus 100 acquires driving information of the first preceding vehicle v1 and the second preceding vehicle v2 (1010).

The front radar 120 of the vehicle 1 may emit a detection wave toward the front of the vehicle 1. The detection wave emitted from the front radar 120 may reach each of the first preceding vehicle v1 and the second preceding vehicle v2 through various paths, and be reflected by each of the first preceding vehicle v1 and the second preceding vehicle v2. The front radar 120 may receive a reflected wave reflected from each of the first preceding vehicle v1 and the second preceding vehicle v2, and provide the controller 140 with radar data including information about the reflected wave.

The controller 140 may determine relative distances d1 and d2 and relative speeds rs1 and rs2 of each of the first preceding vehicle v1 and the second preceding vehicle v2, based on the reflected waves reflected from each of the first preceding vehicle v1 and the second preceding vehicle v2. The controller 140 may determine travelling speeds s1 and s2 of each of the first preceding vehicle v1 and the second preceding vehicle v2, based on a travelling speed of the vehicle 1 and the relative speeds rs1 and rs2 of each of the first preceding vehicle v1 and the second preceding vehicle v2. Also, the controller 140 may determine accelerations a1 and a2 of each of the first preceding vehicle v1 and the second preceding vehicle v2, based on changes in the relative speeds rs1 and rs2 of each of the first preceding vehicle v1 and the second preceding vehicle v2.

The driver assistance apparatus 100 determines whether the acceleration a1 of the first preceding vehicle v1 is less than a first reference acceleration (1020).

The controller 140 may compare the acceleration a1 of the first preceding vehicle v1, determined from the radar data, with the first reference acceleration to determine whether the acceleration a1 of the first preceding vehicle v1 is less than the first reference acceleration. Here, the first reference acceleration may be a value less than '0'. For example, the first reference acceleration may be '−0.1 g (gravity acceleration)'. The acceleration a1 of the first preceding vehicle v1 which is less than the first reference acceleration may indicate that the first preceding vehicle v1 is decelerating.

When the acceleration a1 of the first preceding vehicle v1 is not less than the first reference acceleration (No in operation 1020), the driver assistance apparatus 100 determines whether the travelling speed s1 of the first preceding vehicle v1 is less than a first reference speed (1030).

The controller 140 may compare the travelling speed s1 of the first preceding vehicle v1, determined from the radar data, with the first reference speed to determine whether the travelling speed s1 of the first preceding vehicle v1 is less than the first reference speed. Here, the first reference speed may be a travelling speed for indicating traffic congestion, for example, approximately 80 kph (km per hour). The travelling speed s1 of the first preceding vehicle v1 which is less than the first reference speed may indicate that the first preceding vehicle v1 is travelling at a low speed.

When the travelling speed s1 of the first preceding vehicle v1 is not less than the first reference speed (No in operation 1030), the driver assistance apparatus 100 determines whether the acceleration a2 of the second preceding vehicle v2 is less than a second reference acceleration (1040).

The controller 140 may compare the acceleration a2 of the second preceding vehicle v2, determined from the radar data, with the second reference acceleration to determine whether the acceleration a2 of the second preceding vehicle v2 is less than the second reference acceleration. Here, the second reference acceleration may be a value less than '0'. For example, the second reference acceleration may be '−0.1 g'. The acceleration a2 of the second preceding vehicle v2 which is less than the second reference acceleration may indicate that the second preceding vehicle v2 is decelerating.

When the acceleration a2 of the second preceding vehicle v2 is not less than the second reference acceleration (No in operation 1040), the driver assistance apparatus 100 determines whether the travelling speed s2 of the second preceding vehicle v2 is less than a second reference speed (1050).

The controller 140 may compare the travelling speed s2 of the second preceding vehicle v2, determined from the radar data, with the second reference speed to determine whether the travelling speed s2 of the second preceding vehicle v2 is less than the second reference speed. Here, the second reference speed may be a travelling speed for indicating traffic congestion, for example, approximately 80 kph. The travelling speed s2 of the second preceding vehicle v2 which is less than the second reference speed may indicate that the second preceding vehicle v2 is travelling at a low speed.

When the travelling speed s2 of the second preceding vehicle v2 is not less than the second reference speed (No in operation 1050), the driver assistance apparatus 100 continues operations without changing a reference time for emergency braking (1060).

As described above, the driver assistance apparatus 100 may determine an estimated collision time with the first preceding vehicle v1, and perform emergency braking on the vehicle 1 based on comparison between the determined estimated collision time and the reference time for emergency braking. In this instance, the reference time for emergency braking may be a critical parameter for emergency braking of the vehicle 1.

For instance, when the reference time for emergency braking increases, the frequency of emergency braking of the vehicle 1 by the driver assistance apparatus 100 increases. Accordingly, although a likelihood of collision between the vehicle 1 and the first preceding vehicle v1 decreases, frequent braking may cause inconvenience to a driver. Also, when the reference time for emergency braking decreases, the frequency of emergency braking of the vehicle 1 by the driver assistance apparatus 100 decreases. Accordingly, although the driver's inconvenience due to emergency braking is reduced, the likelihood of collision between the vehicle 1 and the first preceding vehicle v1 may be increased.

In this instance, when both the first preceding vehicle v1 and the second preceding vehicle v2 neither decelerate nor drive at a low speed, the controller 140 may determine that the likelihood of collision with the first preceding vehicle v1 is low. Because it is determined that the likelihood of collision with the first preceding vehicle v1 is low, the controller 140 may continue operations without changing the reference time for emergency braking or decrease the reference time for emergency braking in order to minimize the driver's inconvenience due to frequent emergency braking.

When the acceleration a1 of the first preceding vehicle v1 is less than the first reference acceleration (Yes in operation 1020), the driver assistance apparatus 100 warns the driver of traffic congestion ahead (1070), limits acceleration of the vehicle 1 (1080), and increases the reference time for emergency braking (1090). In addition, when the travelling speed s1 of the first preceding vehicle v1 is less than the first reference speed (Yes in operation 1030), or the acceleration a2 of the second preceding vehicle v2 is less than the second reference acceleration (Yes in operation 1040), or the travelling speed s2 of the second preceding vehicle v2 is less than the second reference speed (Yes in operation 1050), the driver assistance apparatus 100 also warns the driver of traffic congestion ahead (1070), limits the acceleration of the vehicle 1 (1080), and increases the reference time for emergency braking (1090).

When at least one of the first preceding vehicle v1 or the second preceding vehicle v2 decelerates or travels at a low speed, the controller 140 may determine that traffic congestion occurs in front of the vehicle 1, and predict that the first preceding vehicle v1 will also decelerate. Accordingly, the controller 140 may determine that the vehicle 1 is likely to collide with the first preceding vehicle v1.

Thus, the controller 140 may control the driver assistance apparatus 100 to warn the driver of the likelihood of collision with the first preceding vehicle v1, limit the acceleration of the vehicle 1 and operate more sensitively to an approach of the first preceding vehicle v1.

For example, the controller 140 may warn the driver of traffic congestion in front of the vehicle 1 through a display and/or speaker of the vehicle 1.

Despite the deceleration of the first preceding vehicle v1 or the second preceding vehicle v2, when the driver does not decelerate or change a driving direction of the vehicle 1, the controller 140 may limit the acceleration of the vehicle 1 to avoid the collision with the first preceding vehicle v1. In this instance, the driver's intervention may be determined based on a displacement of a brake pedal and/or a steering angle of a steering wheel.

Also, the controller 140 may sensitively perform emergency braking to avoid the collision with the first preceding vehicle v1. Specifically, the controller 140 may increase the reference time for emergency braking, and thus when the vehicle 1 approaches the first preceding vehicle v1, the controller 140 may perform emergency braking more quickly than when the reference time for emergency braking is not changed.

As described above, the driver assistance apparatus 100 may predict the likelihood of collision between the vehicle 1 and the first preceding vehicle v1 based on the driving state a1 and s1 of the first preceding vehicle v1 and the driving state a2 and s2 of the second preceding vehicle v2, and change the reference time for emergency braking based on the likelihood of collision. Accordingly, the driver assistance apparatus 100 may minimize the driver's inconvenience caused by frequent emergency braking when the likelihood of collision is low, and rapidly avoid the collision with the first preceding vehicle v1 when the likelihood of collision is high.

Although it has been described that the driver assistance apparatus 100 changes the reference time for emergency braking based on the driving state a1 and s1 of the first preceding vehicle v1 and the driving state a2 and s2 of the second preceding vehicle (pre-preceding vehicle) v2, the driver assistance apparatus 100 is not limited thereto.

For example, the driver assistance apparatus 100 may change the reference time for emergency braking, based on a driving state of the pre-second preceding vehicle v3 which is located in front of the second preceding vehicle v2 and/or a driving state of other vehicles in front of the pre-second preceding vehicle v3.

As another example, the driver assistance apparatus 100 may change the reference time for emergency braking based on a distance between the first preceding vehicle v1 and the second preceding vehicle v2 and/or a distance between the second preceding vehicle v2 and the pre-second preceding vehicle v3. When the distance between the first preceding vehicle v1 and the second preceding vehicle v2 is less than a reference distance and the distance between the second preceding vehicle v2 and the pre-second preceding vehicle v3 is less than the reference distance, the driver assistance apparatus 100 may increase the reference time for emergency braking.

FIG. 5 illustrates operations of changing a parameter for collision avoidance by a driver assistance apparatus according to an embodiment.

Operations 1100 of changing a parameter for collision avoidance by the driver assistance apparatus 100 are described with reference to FIG. 5.

The driver assistance apparatus 100 determines a continuous driving time of the vehicle 1 (1110).

The controller 140 may include a timer, and determine the continuous driving time of the vehicle 1 based on an output of the timer.

The driver assistance apparatus 100 determines whether the continuous driving time of the vehicle 1 is greater than or equal to a reference time (1120).

The controller 140 may compare the continuous driving time of the vehicle 1 with the reference time to determine whether the continuous driving time of the vehicle 1 is greater than or equal to the reference time.

Here, the reference time may be determined as a period of time during which a driver feels fatigue on average when the driver keeps driving the vehicle 1. For example, the reference time may be two hours.

When it is not determined that the continuous driving time of the vehicle 1 is greater than or equal to the reference time (No in operation 1120), the driver assistance apparatus 100 may determine the continuous driving time of the vehicle 1 again.

When it is determined that the continuous driving time of the vehicle 1 is greater than or equal to the reference time (Yes in operation 1120), the driver assistance apparatus 100 corrects a reference acceleration and a reference speed to change the reference time for emergency braking (1130).

When the continuous driving time of the vehicle 1 is greater than or equal to the reference time, the driver's fatigue may increase and the driver's reaction speed to avoid a collision with the first preceding vehicle v1 may be slowed.

The controller 140 may correct first and second reference accelerations and first and second reference speeds to change the reference time for emergency braking for safer driving.

As described above with reference to FIG. 4, the driver assistance apparatus 100 corrects the reference time for emergency braking, based on a comparison result between the acceleration a1 of the first preceding vehicle v1 and the first reference acceleration, a comparison result between the travelling speed s1 of the first preceding vehicle v1 and the first reference speed, a comparison result between the acceleration a2 of the second preceding vehicle v2 and the second reference acceleration, and a comparison result between the travelling speed s2 of the second preceding vehicle v2 and the second reference speed.

The controller 140 may correct the first and second reference accelerations and the first and second reference speeds, which are the standards for correcting the reference time for emergency braking, based on the continuous driving time of the vehicle 1. For example, the controller 140 may correct the first and second reference accelerations from '−0.1 g' to '−0.05 g', and the first and second reference speeds from '80 kph' to '50 kph'.

Accordingly, when the continuous driving time of the vehicle 1 exceeds the reference time for which the driver feels fatigue, the controller 140 may allow the driver assistance apparatus 100 to perform emergency braking more quickly.

As described above, when the continuous driving time of the vehicle 1 exceeds the reference time for which the driver feels fatigue, the driver assistance apparatus 100 may reduce a threshold value for determining traffic congestion. Accordingly, the driver assistance apparatus 100 may quickly determine traffic congestion and perform emergency braking.

FIG. 6 illustrates an example of collision avoidance operations by a driver assistance apparatus according to an embodiment.

Collision avoidance operations 1200 by the driver assistance apparatus 100 are described with reference to FIG. 6.

The driver assistance apparatus 100 acquires driving information of the first preceding vehicle v1 and the second preceding vehicle v2 (1210).

Operation 1210 may be the same as operation 1010 of FIG. 4. A description of operation 1210 is replaced with the above description of operation 1010.

The driver assistance apparatus 100 determines whether an estimated collision time between the first preceding vehicle (preceding vehicle) v1 and the second preceding vehicle (pre-preceding vehicle) v2 is less than a reference time for emergency braking (1220).

The controller 140 may determine the estimated collision time between the preceding vehicle v1 and the pre-preceding vehicle v2, based on the relative distances d1 and d2 and relative speeds rs1 and rs2 of each of the first preceding vehicle v1 and the second preceding vehicle v2.

For example, the controller 140 may determine the estimated collision time between the preceding vehicle v1 and the pre-preceding vehicle v2 using [Equation 1] below.

$$TTC_{12} = \frac{d_2 - d_1}{rs_2 - rs_1} \qquad \text{[Equation 1]}$$

where TTC12 denotes the estimated collision time between the first preceding vehicle v1 and the second preceding vehicle v2, d2 denotes a relative distance to the second preceding vehicle v2, d1 denotes a relative distance to the first preceding vehicle v1, rs2 denotes a relative speed of the second preceding vehicle v2 and rs1 denotes a relative speed of the first preceding vehicle v1.

In this instance, the relative speed rs2 of the second preceding vehicle v2 and the relative speed rs1 of the first preceding vehicle v1 may be replaced with the travelling speed s2 of the second preceding vehicle v2 and the travelling speed s1 of the first preceding vehicle v1, respectively.

The controller 140 may compare the estimated collision time between the preceding vehicle v1 and the pre-preceding vehicle v2, determined using [Equation 1], with the reference time for emergency braking to identify whether the estimated collision time between the preceding vehicle v1 and the pre-preceding vehicle v2 is less than the reference time for emergency braking.

When it is determined that the estimated collision time between the preceding vehicle v1 and the pre-preceding vehicle v2 is less than the reference time for emergency braking (Yes in operation 1220), the driver assistance apparatus 100 warns a driver of traffic congestion ahead (1230), limits an acceleration of the vehicle 1 (1240), and increases the reference time for emergency braking (1250).

When the estimated collision time between the preceding vehicle v1 and the pre-preceding vehicle v2 is less than the reference time for emergency braking, the controller 140 may determine that the first preceding vehicle v1 will collide with the second preceding vehicle v2 within a short time, or the first preceding vehicle v1 will perform emergency braking within a short time. Also, the controller 140 may determine that a likelihood of collision between the vehicle 1 and the first preceding vehicle v1 increases due to the emergency braking or collision of the first preceding vehicle v1.

The controller 140 may perform operations to remind the driver of a risk of collision with the first preceding vehicle v1 and avoid the collision with the first preceding vehicle v1.

Operations 1230, 1240 and 1250 may be the same as operations 1070, 1080 and 1090 of FIG. 4, respectively. A description of operations 1230, 1240 and 1250 is replaced with the above description of operations 1070, 1080 and 1090.

When it is not determined that the estimated collision time between the preceding vehicle v1 and the pre-preceding vehicle v2 is less than the reference time for emergency braking (No in operation 1220), the driver assistance apparatus 100 continues operations without changing the reference time for emergency braking (1260).

When it is not determined that the estimated collision time between the preceding vehicle v1 and the pre-preceding vehicle v2 is less than the reference time for emergency braking, the controller 140 may determine that a likelihood of collision between the first preceding vehicle v1 and the second preceding vehicle v2 is low. Because it is determined that the likelihood of collision with the first preceding vehicle v1 is low, the controller 140 may continue operations without changing the reference time for emergency braking or decrease the reference time for emergency braking in order to minimize the driver's inconvenience caused by frequent emergency braking.

As such, the driver assistance apparatus 100 may predict the likelihood of collision between the first preceding vehicle v1 and the second preceding vehicle v2, based on the driving state a1 and s1 of the first preceding vehicle v1 and the driving state a2 and s2 of the second preceding vehicle v2, and change the reference time for emergency braking based on the likelihood of collision. Accordingly, the driver assistance apparatus 100 may minimize the driver's inconvenience caused by frequent emergency braking when the likelihood of collision is low, and rapidly avoid the collision with the first preceding vehicle v1 when the likelihood of collision is high.

Although it has been described that the driver assistance apparatus 100 changes the reference time for emergency braking based on the estimated collision time between the first preceding vehicle v1 and the pre-preceding vehicle v2, the driver assistance apparatus 100 is not limited thereto. For example, the driver assistance apparatus 100 may change the reference time for emergency braking based on an estimated collision time with the pre-second preceding vehicle v3 which is located in front of the second preceding vehicle v2 and/or other vehicles in front of the pre-second preceding vehicle v3.

FIG. 7 illustrates an example of collision avoidance operations by a driver assistance apparatus according to an embodiment.

Collision avoidance operations 1300 by the driver assistance apparatus 100 are described with reference to FIG. 7.

The driver assistance apparatus 100 detects deceleration of the first preceding vehicles v1, v2 and v3 or collision among the first preceding vehicles v1, v2 and v3 (1310).

The controller 140 may identify whether the first preceding vehicles v1, v2 and v3 decelerate or travel at a low speed based on driving information of the first preceding vehicles v1, v2 and v3. Also, the controller 140 may determine that a risk of collision (or a likelihood of collision) among the first preceding vehicles v1, v2 and v3 is high based on an estimated collision time among the first preceding vehicles v1, v2 and v3.

When the deceleration of the first preceding vehicles v1, v2 and v3 or the risk of collision among the first preceding vehicles v1, v2 and v3 is detected, the driver assistance apparatus 100 may determine whether a driver's braking intention is detected (1320).

The controller 140 may receive information about a displacement of a brake pedal and/or movement speed from the braking system 30 through a CAN transceiver 143. The controller 140 may determine the driver's braking intention based on the displacement of brake pedal and/or movement speed. For example, when the brake pedal moves at a predetermined speed or more or by a predetermined distance or more, the controller 140 may detect the driver's braking intention.

When the driver's braking intention is not detected (No in operation 1320), the driver assistance apparatus 100 determines whether a driver's steering intention is detected (1330).

The controller 140 may receive information about a steering angle of a steering wheel and/or steering torque from the steering system 40 through the CAN transceiver 143. The controller 140 may determine the driver's steering intention based on the steering angle of steering wheel and/or steering torque. For example, when the steering wheel rotates at a predetermined steering angle or more or a steering torque greater than or equal to a predetermined steering torque is applied to the steering wheel, the controller 140 may detect the driver's steering intention.

When the driver's steering intention is not detected (No in operation 1330), the driver assistance apparatus 100 warns the driver of traffic congestion ahead and/or forward collision (1340), limits acceleration of the vehicle 1 (1350), and increases the reference time for emergency braking (1360).

Despite the predicted traffic congestion ahead and/or predicted forward collision, when the driver does not stop the vehicle 1 or change a driving direction of the vehicle 1, the controller 140 may perform operations to remind the driver of the risk of collision with the first preceding vehicle v1 and avoid the collision with the first preceding vehicle v1.

Operations 1340, 1350 and 1360 may be the same as operations 1070, 1080 and 1090 of FIG. 4, respectively. A description of operations 1340, 1350 and 1360 is replaced with the above description of operations 1070, 1080 and 1090.

When the driver's braking intention is detected (Yes in operation 1320) or the driver's steering intention is detected (Yes in operation 1330), the driver assistance apparatus 100 continues operations without changing the reference time for emergency braking (1370).

When the driver's braking intention and/or the driver's steering intention is detected, it is determined that the driver avoids the collision with the first preceding vehicle v1. Accordingly, the controller 140 may continue operations without changing the reference time for emergency braking or decrease the reference time for emergency braking in order to minimize the driver's inconvenience due to frequent emergency braking.

As described above, when the vehicle 1 is likely to collide with the first preceding vehicle v1, the driver assistance apparatus 100 may change the reference time for emergency braking based on whether the driver intervenes. Accordingly, the driver assistance apparatus 100 may minimize the driver's inconvenience caused by frequent emergency braking when the likelihood of collision is low, and rapidly avoid the collision with the first preceding vehicle v1 when the likelihood of collision is high.

As is apparent from the above, according to the embodiments of the disclosure, the apparatus and method for assisting driving of a vehicle can avoid a collision with a first preceding vehicle, based on a relative speed and relative distance of the first preceding vehicle as well as a relative speed and relative distance of a pre-preceding vehicle.

The disclosed embodiments may be implemented in the form of a recording medium storing computer-executable instructions that are executable by a processor. The instructions may be stored in the form of a program code, and when executed by a processor, the instructions may generate a program module to perform operations of the disclosed embodiments. The recording medium may be embodied as a computer-readable recording medium.

Although embodiments have been described for illustrative purposes, those skilled in the art will appreciate that various modifications, additions and substitutions are possible, without departing from the scope and spirit of the disclosure. Therefore, embodiments have not been described for limiting purposes.

What is claimed is:

1. An apparatus for assisting driving of a vehicle, the apparatus comprising:
   a radar mounted on the vehicle to have a front field of view of the vehicle and configured to acquire detection data; and
   a controller comprising a processor, configured to process the detection data, and configured to identify a first estimated collision time between the vehicle and a first preceding vehicle, located in front of the vehicle, based on processing of the detection data, and to control a braking system of the vehicle to brake the vehicle in response to the first estimated collision time being less than a first reference time,
   wherein the controller is configured to control the braking system of the vehicle to brake the vehicle, in response to a second estimated collision time between the first preceding vehicle and a second preceding vehicle, located in front of the first preceding vehicle, being less than the first reference time, and the first estimated collision time being less than a second reference time which is greater than the first reference time.

2. The apparatus of claim 1, wherein the controller is configured to control the braking system of the vehicle to brake the vehicle, in response to at least one of deceleration of the first preceding vehicle, low-speed driving of the first preceding vehicle, deceleration of the second preceding vehicle or low-speed driving of the second preceding vehicle being identified and the first estimated collision time being less than the second reference time.

3. The apparatus of claim 2, wherein the controller is configured to:
   detect a driver's intervention for braking or steering the vehicle in response to the at least one being identified, and
   control the braking system of the vehicle to brake the vehicle, in response to the driver's intervention not being detected and the first estimated collision time being less than the second reference time.

4. The apparatus of claim 1, wherein the controller is configured to control the braking system of the vehicle to brake the vehicle, in response to at least one of an acceleration of the first preceding vehicle less than a first reference acceleration, a travelling speed of the first preceding vehicle less than a first reference speed, an acceleration of the second preceding vehicle less than a second reference acceleration, or a travelling speed of the second preceding vehicle less than a second reference speed being identified, and the first estimated collision time being less than the second reference time.

5. The apparatus of claim 4, wherein the controller is configured to decrease at least one of the first reference acceleration, the first reference speed, the second reference acceleration or the second reference speed, in response to a continuous driving time of the vehicle being greater than or equal to the first reference time.

6. The apparatus of claim 1, wherein the controller is configured to:
   detect a driver's intervention for braking or steering the vehicle in response to the second estimated collision time between the first preceding vehicle and the second preceding vehicle being less than the first reference time, and
   control the braking system of the vehicle to brake the vehicle, in response to the driver's intervention not being detected and the first estimated collision time being less than the second reference time.

7. The apparatus of claim 1, wherein the controller is configured to:
   identify a distance between the vehicle and the first preceding vehicle and a distance between the first preceding vehicle and the second preceding vehicle, based on processing of the detection data, and
   control the braking system of the vehicle to brake the vehicle, in response to at least one of the distance between the vehicle and the first preceding vehicle or the distance between the first preceding vehicle and the second preceding vehicle being identified as being less than a reference distance, and the first estimated collision time being less than the second reference time.

8. A method for assisting driving of a vehicle, the method comprising:
   acquiring detection data through a radar, mounted on the vehicle to have a front field of view of the vehicle; and
   identifying a first estimated collision time between the vehicle and a first preceding vehicle, located in front of the vehicle, based on processing of the detection data; and
   braking the vehicle in response to the first estimated collision time being less than a reference time,
   wherein the braking of the vehicle comprises braking the vehicle, in response to a second estimated collision time between the first preceding vehicle and a second preceding vehicle, located in front of the first preceding vehicle, being less than a first reference time, and the first estimated collision time being less than a second reference time which is greater than the first reference time.

9. The method of claim 8, wherein the braking of the vehicle comprises braking the vehicle, in response to at least one of deceleration of the first preceding vehicle, low-speed driving of the first preceding vehicle, deceleration of the second preceding vehicle or low-speed driving of the second preceding vehicle being identified and the first estimated collision time being less than the second reference time.

10. The method of claim 9, wherein the braking of the vehicle further comprises detecting a driver's intervention for braking or steering the vehicle in response to the at least one being identified, and
    braking the vehicle, in response to the driver's intervention not being detected and the first estimated collision time being less than the second reference time.

11. The method of claim 8, wherein the braking of the vehicle brakes the vehicle, in response to at least one of an acceleration of the first preceding vehicle less than a first reference acceleration, a travelling speed of the first preceding vehicle less than a first reference speed, an acceleration of the second preceding vehicle less than a second reference acceleration, or a travelling speed of the second preceding vehicle less than a second reference speed being identified, and the first estimated collision time being less than the second reference time.

12. The control method of claim 11, wherein the braking of the vehicle further comprises decreasing at least one of the first reference acceleration, the first reference speed, the second reference acceleration or the second reference speed, in response to a continuous driving time of the vehicle being greater than or equal to the first reference time.

13. The control method of claim 8, wherein the braking of the vehicle further comprises detecting a driver's intervention for braking or steering the vehicle in response to an estimated collision time between the first preceding vehicle and the second preceding vehicle being less than the reference time, and
    braking the vehicle, in response to the driver's intervention not being detected and the first estimated collision time being less than the second reference time.

14. The control method of claim 8, further comprising:
    identifying a distance between the vehicle and the first preceding vehicle and a distance between the first preceding vehicle and the second preceding vehicle, based on processing of the detection data, and
    braking the vehicle, in response to at least one of the distance between the vehicle and the first preceding vehicle or the distance between the first preceding vehicle and the second preceding vehicle being identified as being less than a reference distance, and the first estimated collision time being less than the second reference time.

15. An apparatus for assisting driving of a vehicle, the apparatus comprising:
    a radar mounted on the vehicle to have a front field of view of the vehicle and configured to acquire detection data; and
    a controller comprising a processor, configured to process the detection data, and configured to identify a first distance between the vehicle and a first preceding vehicle, located in front of the vehicle, based on processing of the detection data, and to control a braking system of the vehicle to brake the vehicle in response to the first distance being less than a first reference distance,
    wherein the controller is configured to:
    identify a second distance between the first preceding vehicle and a second preceding vehicle, located in front of the first preceding vehicle, based on processing of the detection data, and
    control the braking system of the vehicle to brake the vehicle, in response to the first distance being less than the first reference distance and the second distance being less than a second reference distance which is less than the first reference distance.

* * * * *